United States Patent
Huang

(10) Patent No.: US 9,547,116 B2
(45) Date of Patent: Jan. 17, 2017

(54) LIGHT GUIDE PLATE HAVING UNIFORM LIGHT EMISSION AND MANUFACTURING METHOD THEREOF

(71) Applicant: HON HAI PRECISION INDUSTRY CO., LTD., New Taipei (TW)

(72) Inventor: Yung-Lun Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 634 days.

(21) Appl. No.: 13/862,455

(22) Filed: Apr. 14, 2013

(65) Prior Publication Data
US 2014/0140099 A1 May 22, 2014

(30) Foreign Application Priority Data
Nov. 20, 2012 (TW) .............................. 101143346 A

(51) Int. Cl.
F21V 7/04 (2006.01)
F21V 8/00 (2006.01)

(52) U.S. Cl.
CPC ........... *G02B 6/0036* (2013.01); *G02B 6/0061* (2013.01)

(58) Field of Classification Search
CPC ........................... G02B 6/0036; G02B 6/0061
See application file for complete search history.

(56) References Cited

U.S. PATENT DOCUMENTS

| | | | | |
|---|---|---|---|---|
| 7,188,989 B2 * | 3/2007 | Miyashita | .............. | G02B 6/002 362/621 |
| 2009/0244690 A1 * | 10/2009 | Lee | ...................... | G02B 6/0061 359/298 |
| 2011/0292678 A1 * | 12/2011 | Huang | ................. | G02B 6/0043 362/606 |
| 2012/0163032 A1 * | 6/2012 | Hsu | .............................. | 362/623 |

* cited by examiner

*Primary Examiner* — Andrew Coughlin
*Assistant Examiner* — Meghan Ulanday
(74) *Attorney, Agent, or Firm* — Zhigang Ma

(57) ABSTRACT

A light guide plate includes a light incident surface, a side surface opposite to the light incident surface, and a light emitting surface connecting to the light incident surface and the side surface. The light emitting surface has a first portion adjacent to the light incident surface and a second portion adjacent to the side surface. The first portion defines a number of first micro recesses. The second portion defines a number of second micro recesses. In a plane perpendicular to the light emitting surface and the side surface, a cross section of each second micro recess is a portion of an ellipse. A major axis of the ellipse is inclined towards the light incident surface. A maximum depth of each second micro recess is greater than a maximum depth of each first micro recess.

12 Claims, 3 Drawing Sheets

LIGHT GUIDE PLATE HAVING UNIFORM LIGHT EMISSION AND MANUFACTURING METHOD THEREOF

BACKGROUND

1. Technical Field

The present disclosure relates to a light guide plate and a method of manufacturing the light guide plate.

2. Description of Related Art

Light guide plates are often used to expand a number of point light sources to an area light source. A light guide plate includes a light emitting surface, a light incident surface perpendicular to the light emitting surface, a bottom surface opposite to the light emitting surface, and a side surface opposite to the light incident surface. The light incident surface and the side surface are connected to two opposite ends of the light emitting surface, respectively. The light source is positioned adjacent to the light incident surface. Because a portion of the light rays arriving at the side surface away from the light incident surface can emit from the side surface, therefore, the brightness of an end of the light emitting surface connected to the side surface is less than the brightness of the other end of the light emitting surface connected to the light incident surface. That is, the overall brightness of the light emitting surface is not uniform.

Therefore, it is desirable to provide a light guide plate and a manufacturing method thereof that can overcome the above-mentioned limitations.

BRIEF DESCRIPTION OF THE DRAWINGS

Many aspects of the embodiments should be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
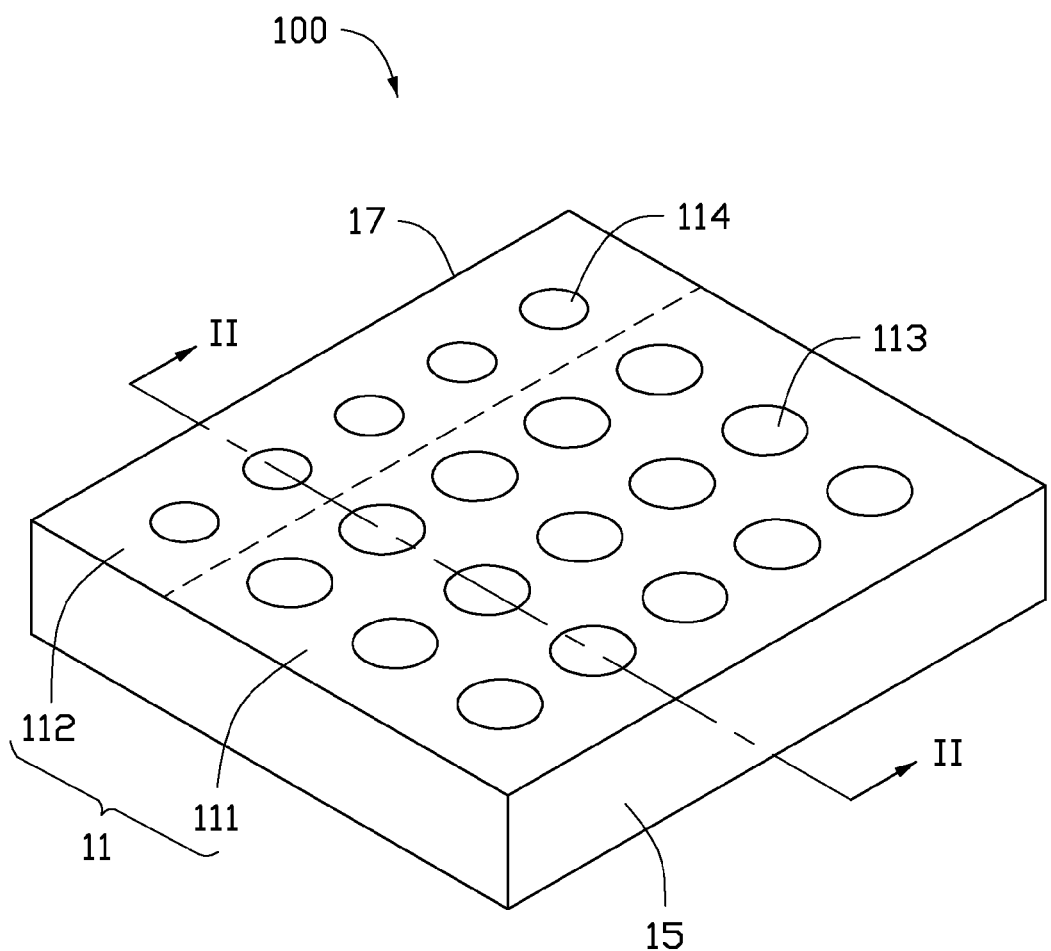
FIG. 1 is a schematic view of a light guide plate, according to an exemplary embodiment.
Figure 2:
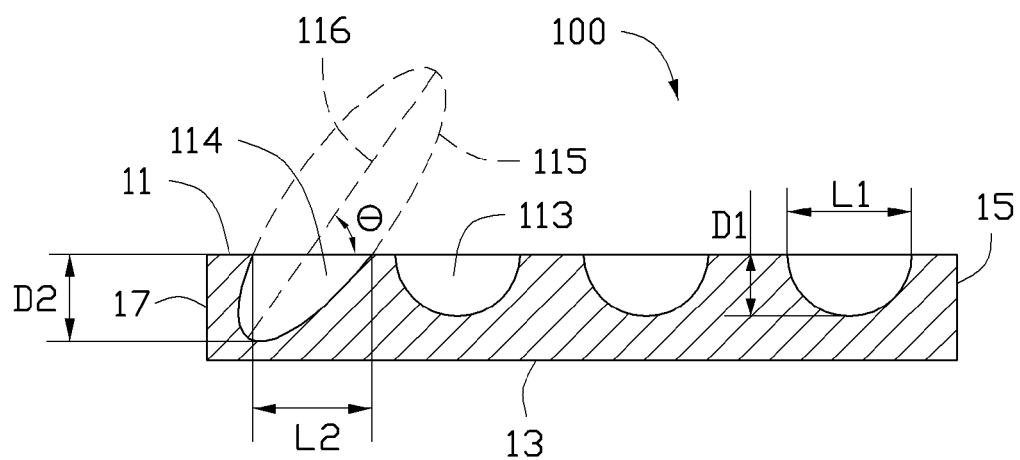
FIG. 2 is a cross-sectional view of the light guide plate taken along a line II-II of FIG. 1.

FIG. 1 and FIG. 2 illustrate a light guide plate 100 in accordance to an embodiment. The light guide plate 100 is substantially cubic, and is made of transparent material (such as acrylic resin or polyethylene resin). The light guide plate 100 includes a light emitting surface 11, a bottom surface 13, a light incident surface 15, and a side surface 17.

The bottom surface 13 is substantially parallel to the light emitting surface 11. The side surface 17 is substantially parallel to the light incident surface 15. Both of the light incident surface 15 and the side surface 17 are perpendicularly connected to the light emitting surface 11 and the bottom surface 13, that is, the light incident surface 15 and the side surface 17 are substantially perpendicular to the light emitting surface 11. In other embodiments, the bottom surface 13 can be inclined with respect to the light emitting surface 11.

The light incident surface 15 is used for transmitting light rays from a light source (not shown) into the light guide plate 100. The bottom surface 13 and the side surface 17 are used for respectively internally reflecting the light rays in the light guide plate 100. The light emitting surface 11 transmits a portion of the light rays incident thereon to the exterior above the light guide plate 100, and reflects the other portion of the light rays incident thereon back into the light guide plate 100.

The light emitting surface 11 is imaginarily divided into a rectangular first portion 111 adjacent to the light incident surface 15 and a rectangular second portion 112 adjacent to the side surface 17. A lengthwise direction of the second portion 112 is substantially parallel to the side surface 17.

The first portion 111 defines a number of first micro recesses 113, and the second portion 112 defines a number of second micro recesses 114. The shapes of the first micro recesses 113 are the same as each other. The shapes of the second micro recesses 114 are the same as each other. The first micro recesses 113 are arranged in an array of rows and columns. The second micro recesses 114 are arranged in one line parallel to the side surface 17. In this embodiment, the first micro recesses 113 and the second micro recesses 114 are cooperated to form an array.

The first micro recesses 113 each are hemispherical or spherical crown shaped. In a plane perpendicular to the light emitting surface 11 and the side surface 17, a cross section of each second micro recess 114 is a portion of an ellipse 115. A major axis 116 of the ellipsoid 115 is inclined towards the light incident surface 15, and an included angle θ formed between the major axis 116 and the light emitting surface 11 is an acute angle. Along a direction from the light emitting surface 11 to the bottom surface 13, each of the second micro recesses 114 is gradually away from the first micro recesses 113.

A maximum width L2 of each of the second micro recesses 114 is less than the width L1 of each of the first micro recesses 113, and a maximum depth D2 of each of the second micro recesses 114 is greater than the depth D1 of each of the first micro recesses 113. The first micro recesses 113 destroy the totally reflecting path of the light rays in the light guide plate 100, and thus a portion of the light rays perpendicularly emit to the exterior from the light emitting surface 11, and the other portion of the light rays are reflected to the bottom surface 13, and then transmit towards the side surface 17.

Because a maximum depth D2 of each of the second micro recesses 114 is greater than the depth D1 of each of the first micro recesses 113, most portion of the light rays can arrive the inner surface of the second micro recesses 114. Because the second micro recesses 114 are inclined with respect to the light incident surface 15, the second micro recesses 114 can reflect most portion of the light rays towards the light emitting surface 11, and the amount of the light rays emitted from the side surface 17 are reduced, therefore, the brightness of the second portion 112 is improved, the brightness of the second portion 112 is substantially equal to the brightness of the first portion 111, and the brightness of the light emitting surface 11 is distributed uniformly.

Figure 3:
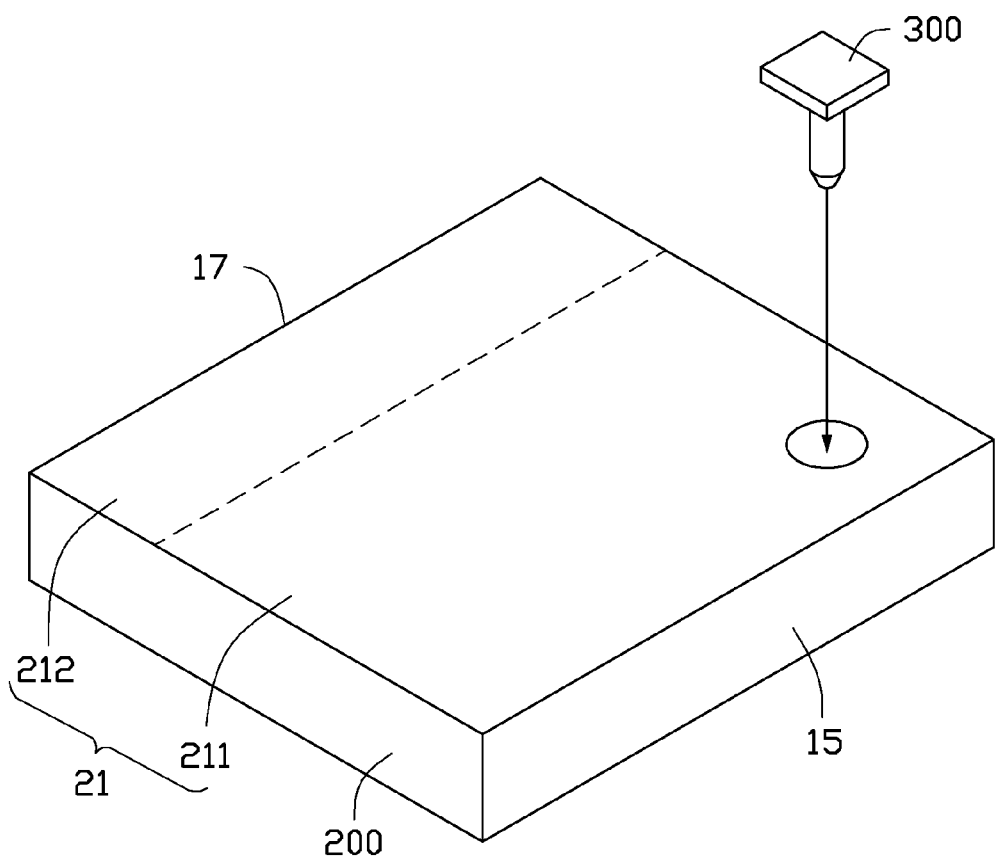
FIG. 3 is a schematic view of a method of manufacturing the light guide plate of FIG. 1, according to an exemplary embodiment.

FIG. 3 shows that a method of manufacturing the light guide plate 100 includes the following steps.

In step S1: a pre-manufactured light guide plate 200 is provided, and the pre-manufactured light guide plate 200 has a pre-manufactured surface 21, the light incident surface 15, and the side surface 17. The pre-manufactured surface 21 is connected to the light incident surface 15 and the side surface 17. The pre-manufactured surface 21 has a first pre-manufactured portion 211 adjacent to the light incident surface 15 and a second pre-manufactured portion 212 adjacent to the side surface 17.

In step S2, a laser device 300 is provided, and the transmitting path of the laser from the laser device 300 is substantially perpendicular to the pre-manufactured surface 21. The laser device 300 produces a number of first micro recesses 113 in an array of rows and columns on the first pre-manufactured portion 211 using a first frequency f1 and a first power P1. The width of each of the first micro recesses 113 is L1, a maximum depth of each of the first micro recesses 113 is D1. In this embodiment, f1=450 micro seconds (μs), P1=5 watts(W), L1=50 micro meters (μm), and D1=3 μm.

In step S3, the laser device 300 is adjusted to make the transmitting path of the laser be inclined towards the light incident surface 15, and the frequency and the power of the laser device 300 are increased, and then the second pre-manufactured portion 212 is formed a number of second micro recesses 114 in one line by the adjusted laser device 300 using a second frequency f2 and a second power P2, therefore, a light guide plate 100 is obtained. A maximum width of each of the second micro recesses 114 is L2, and a maximum depth of each of the second micro recesses 114 is D2, wherein f2>f1, P2>P1, L2<L1, and D2>D1. In this embodiment, f2=600 μs, P2=8 W, L2=45 μm, D2=10 μm.

By employing the light guide plate 100, most light rays arriving at the end of the light guide plate 100 away from the light incident surface 15 can be emitted to the exterior from the emitting surface 11, and thus the brightness of the portion of the light guide plate 100 away from the light incident surface 15 can be increased, and the brightness of the light guide plate 100 can be distributed more uniformly.

It will be understood that the above particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A light guide plate, comprising:
   a light incident surface;
   a side surface opposite to the light incident surface; and
   a light emitting surface connecting to the light incident surface and the side surface, the light emitting surface comprising a first portion and a second portion, the first portion adjacent to the light incident surface, the second portion adjacent to the side surface, wherein the first portion defines a plurality of first micro recesses, the second portion defines a plurality of second micro recesses arranged in at least one line parallel to the side surface; in a plane perpendicular to the light emitting surface and the side surface, a cross section of each of the second micro recesses is a portion of an ellipse, a major axis of the ellipse is inclined relative to the light incident surface, a maximum depth of each of the second micro recesses is greater than a maximum depth of each of the first micro recesses, and thus the second micro recesses reflect most of light rays transmitted in the light guide plate to the light emitting surface to increase the brightness of the second portion.

2. The light guide plate of claim 1, wherein the first micro recesses are semi-spherical shaped or spherical crown shaped.

3. The light guide plate of claim 1, wherein a maximum width of each of the second micro recesses is less than a maximum width of each of the first micro recesses.

4. The light guide plate of claim 1, wherein the first micro recesses are arranged in an array of rows and columns, and the second micro recesses are arranged in one line.

5. The light guide plate of claim 1, wherein the first micro recesses and the second micro recesses cooperate to form an array of rows and columns.

6. The light guide plate of claim 1, wherein the first portion and the second portion are rectangular, and a lengthwise direction of the second portion is substantially parallel to the side surface.

7. The light guide plate of claim 1, further comprising a bottom surface opposite to the light emitting surface, wherein the bottom surface is connected to the light incident surface and the side surface, and is configured for reflecting light rays arriving thereon, each of the second micro recesses is gradually inclined away from the first micro recesses along the major axis of the ellipse along a direction from the light emitting surface to the bottom surface.

8. The light guide plate of claim 1, wherein the light incident surface is substantially perpendicular to the light emitting surface.

9. A method of manufacturing a light guide plate, comprising:
   providing a pre-manufactured light guide plate, the pre-manufactured light guide plate comprising a pre-manufactured surface, a light incident surface, and a side surface, wherein the light incident surface is opposite to the side surface, the pre-manufactured surface connects the light incident surface and the side surface, the pre-manufactured surface has a first pre-manufactured portion adjacent to the light incident surface and a second pre-manufactured portion adjacent to the side surface;
   providing a laser device to emit lasers on the pre-manufactured surface, so as to form a plurality of first micro recesses on the first pre-manufactured portion, the transmission paths of the lasers substantially perpendicular to the light incident surface; and
   adjusting the laser device to make the transmission paths of the lasers be inclined towards the light incident surface to form a plurality of second micro recesses on the second pre-manufactured portion, wherein in a plane perpendicular to the light emitting surface and the side surface, a cross section of each of the second micro recess is a portion of an ellipse, a major axis of the ellipse is inclined relative to the light incident surface, a maximum depth of each of the second micro recesses is greater than a maximum depth of each of the first micro recesses.

10. The method of claim 9, wherein the laser device manufactures the first micro recesses using a first frequency and a first power, and manufactures the second micro recesses using a second frequency and a second power, the second frequency is greater than the first frequency, and the second power is greater than the first power.

11. The method of claim 9, wherein the first micro recesses are arranged in an array of rows and columns, and the second micro recesses are arranged in one line.

12. The method of claim 9, wherein the pre-manufactured light guide plate comprises a bottom surface opposite to the light emitting surface, the bottom surface is connected to the light incident surface and the side surface, and is configured for reflecting light rays arriving thereon, each of the second micro recesses is gradually inclined away from the first micro recesses along the major axis of the ellipse along a direction from the light emitting surface to the bottom surface.

* * * * *